Figure 1:
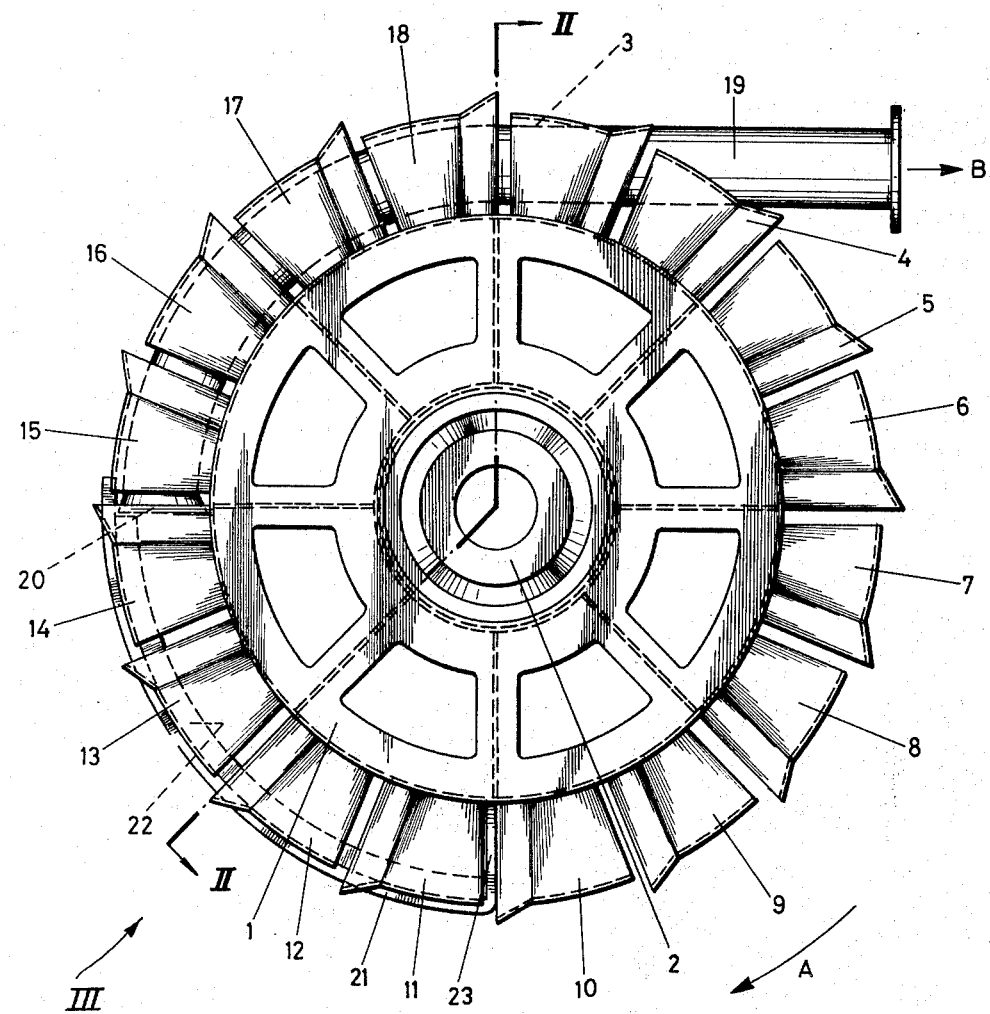

United States Patent [19]

Robertson

[11] 3,823,495
[45] July 16, 1974

[54] ROTATABLY DRIVEN CUTTER FOR A SUCTION DREDGER

[75] Inventor: Carl David Robertson, Akersloot, Netherlands

[73] Assignee: N.V. Industrieele Handelscombinatile, Rotterdam, Netherlands

[22] Filed: Feb. 1, 1973

[21] Appl. No.: 328,604

[30] Foreign Application Priority Data
Feb. 4, 1972   Netherlands.................7201500

[52] U.S. Cl.............................. 37/66, 37/70, 37/189
[51] Int. Cl............................................... E02f 3/92
[58] Field of Search ................... 37/64, 66, 70, 189

[56] References Cited
UNITED STATES PATENTS

| | | | |
|---|---|---|---|
| 1,777,575 | 10/1930 | Penney | 37/66 X |
| 3,476,498 | 11/1969 | Von Bolhar | 37/66 X |
| 3,614,837 | 10/1971 | Araoka | 37/66 X |

FOREIGN PATENTS OR APPLICATIONS

| | | | |
|---|---|---|---|
| 118,321 | 0/1959 | U.S.S.R. | 37/64 |
| 214,411 | 3/1968 | U.S.S.R. | 37/64 |

Primary Examiner—Clifford D. Crowder
Attorney, Agent, or Firm—Young & Thompson

[57] ABSTRACT

A rotatably driven cutter for a suction dredger has a rotatable member with two series of axially spaced scoop-shaped cutters disposed in parallel planes and carried by the rotatable member. The suction tube of the dredger extends over the shaft of the rotatable member and terminates downwardly at about the level of the rotation axis of the member and is extended by a guide plate that continues peripherally between the outer ends of the cutters and terminates below the shaft of the rotatable member. The rotatable member rotates in a direction such that the scoops first encounter the guide plate so that the dredged solids are confined laterally between the cutters and radially between the rotatable member and the guide plate, and then are carried in the direction of rotation toward the mouth of the suction tube.

4 Claims, 3 Drawing Figures

ROTATABLY DRIVEN CUTTER FOR A SUCTION DREDGER

The present invention relates to a cutter with suction means, in which the cutting means comprise two series of cutting blades provided on a shaft which can be driven, each one of said series having a large number of substantially strip-shaped cutting blades, provided on the circumference of a rotatable member and projecting in radial and axial directions, and between which series of blades there is a space wherein the suction mouth of the suction means is disposed.

A cutter of this kind is known from Dutch Pat. No. 83,367. When being used, the cutter with the rotating cutting means is moved slowly in the direction of the shaft bearing the cutting blades, as a result of which movement the soil is cut successively by the cutting blades. The soil cut loose and the water present is sucked up through the suction mouth disposed near the bottom. The drawback of such a cutter is that only a comparatively small portion of the cut soil enters the suction mouth. The cut soil is whirled up and dispersed rather arbitrarily by the cutting blades and also in consequence thereof a fairly large amount of water is sucked in, as a result of which a comparatively poor mixture is obtained.

The object of the present invention is to improve the efficiency of such a cutter.

In accordance with the invention, said object is achieved in that a cutter with suction means is provided, in which the suction tube is disposed above the shaft which can be driven and a guide plate is provided between the two series of cutting blades, which guide plate extends from the suction mouth along the circumference of the series of cutting blades and terminates near the lower side of the cutting means.

With a cutter according to the invention the soil cut loose is forced by the cutting blades into the space between them and is sucked off therefrom similarly as in the known cutter. However, a dispersion of the cut soil is now substantially precluded because of the guide plate. In addition, by the disposition of the suction mouth, a flow following the inner circumference of the cutting device is created, said flow dragging along the entering soil towards the suction mouth. The result is a rich mixture, whereby the efficiency of the cutter is improved considerably.

According to the invention, the feed of the mixture to the suction mouth is promoted when the rotation of the cutting device is in the direction towards the suction mouth. The mouth is preferably positioned at the same level as the rotating shaft.

In order to restrict the inflow of an excessive amount of water at the open end of the guide plate, said plate is bent inwardly in a radial direction. Moreover, said open end may be journaled on the hub of the shaft of the cutting blades. However, it may also be secured to a downwardly directed portion of the ladder.

Figure 2:
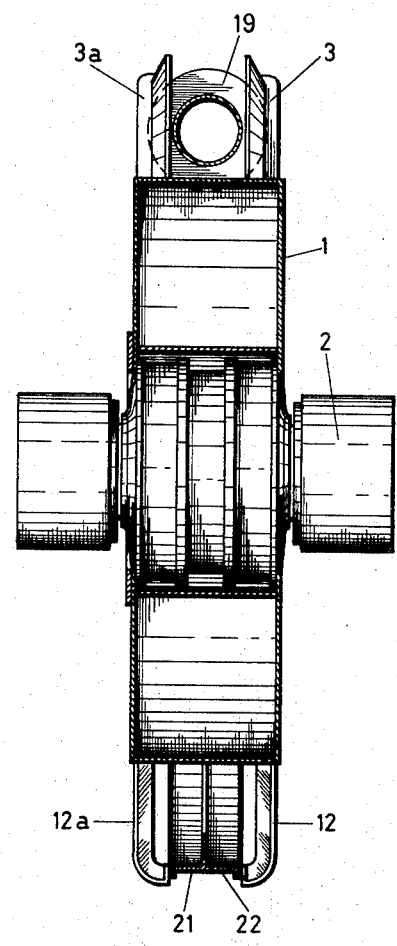
Figure 3:
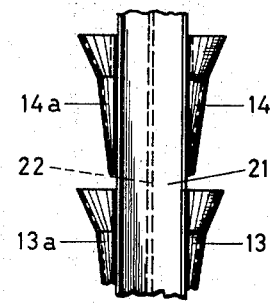

A preferred embodiment of the invention will now be explained more in detail, when taken in conjunction with the accompanying drawings, wherein:

FIG. 1 is a side elevation of the cutting device with suction means of the cutter, FIG. 2 is a section taken along the line II—II of FIG. 1; and FIG. 3 is a front view of a part of the cutting device, illustrated in FIG. 1, seen in the direction of the arrow III in FIG. 1.

In FIG. 1 a drum 1 of open work sheet metal construction is secured on a comparatively thick shaft 2. Said shaft 2 is supported by the ladder of the cutter (not illustrated) and driven by a motor, for example a hydromotor (not illustrated) on the shaft 2. On the circumference and at both sides of the comparatively narrow drum 1, 16 substantially strip-shaped cutting blades (3–18 and 3a – 18a respectively) are mounted. At the upper side relative to the rotatable drum 1, a stationary suction tube 19 is disposed in the space between both sides of the cutting blades or cutting discs, said tube having a funnel-shaped suction mouth 20 directed downwardly. On the lower side in the same space, a stationary guide plate 21 is provided which leads towards the suction mouth 20 and which is secured to or near the suction mouth of the suction tube 19. On the inner side the guide plate 21 is provided with a reinforcing rib 22 and said plate terminates below the drum 1 with a part 23 bent inwardly. Suction tube 19 and guide plate 21 are supported by the ladder of the cutter (not illustrated). Seen in the direction of rotation A, the shape of the cutting blades is diverging, so that the most projecting front part forms the cutting edge of the blade. The cutting blades are not entirely strip-shaped but are scoop-shaped (see FIGS. 2 and 3), so that a substantially closed channel is formed between the guide plate 21, both series of the cutting blades and drum 1. The cut soil is forced into said channel by the cutting blades and can hardly escape. The material cut loose is sucked off continuously by the suction tube 19 having suction mouth 20 (direction of arrow B). The distance between both series of the cutting blades is preferably comparatively small, which is advantageous in initiating the cutting operation or swaying the cutter (moving in the direction of the shaft) respectively. In addition, with such a narrow space between the cutting blades, a thrust effect exerted by the rotating cutting blades on the soil cut loose is obtained in said space in the direction of the suction mouth 20. The bent end portion 23 of the guide plate 21 limits the sucking in of water. Preferably said end portion 23 is journaled on the hub of the drum 1 (not illustrated).

The factors which increase the efficiency of the cutter according to the invention may be summarized as follows:

the large number of cutting blades; the special shape of the blades; the comparatively narrow space between both series of cutting blades; the presence, shape and position of the guide plate 21 with end portion 23 and the shape and position of the suction mouth 20 with suction tube 19.

It is understood that various modifications can be made to the device according to the invention. It is possible, for instance, to make the guide plate 21 longer so that the passage formed between the cutting blades and the guide plate from the suction mouth 20 takes up more than a quarter of the cutter circle. With a longer guide plate it is possible to omit the bent end portion 23, if necessary. The position and shape of the suction mouth may be varied. Other modifications are possible in the embodiment of the suction tube, the drive, the cutting blades, the connection of the guide plate to the suction mouth, and the like.

I claim:

1. Rotatably driven cutter for a suction dredger, comprising a rotatable member having a transverse axis of rotation with two series of cutters arranged about the circumference of the rotatable member in axially spaced apart parallel planes, the cutters being at acute angles to said planes, such that the material cut loose is fed into the space between said two series of cutters, a suction tube disposed above the axis of rotation of the rotatable member with its mouth extending between the two series of cutters, and a guide plate extending from the outer side of the suction mouth between the outer ends of the cutters and terminating below the said axis of rotation.

2. Cutter according to claim 1, wherein the cutter rotates in a direction towards said mouth and the guide plate extends from said mouth in a direction opposite to said direction of rotation.

3. Cutter according to claim 2, wherein the end part of the guide plate below the axis of rotation of the cutter is bent inwardly and extends radially toward the axis of rotation of the rotatable member.

4. Cutter according to claim 1, said cutters being scoop-shaped and opening in the direction of rotation of the rotatable member and confining dredged solids laterally between themselves with the dredged solids also confined between said guide plate and said rotatable member prior to entry of said dredged solids into said suction mouth.

* * * * *